(12) United States Patent
Parker (10) Patent No.: US 8,651,428 B2
(45) Date of Patent: Feb. 18, 2014

(54) AIRCRAFT WING ASSEMBLY

(75) Inventor: Simon John Parker, Bristol (GB)

(73) Assignee: Airbus Operations Limited, Bristol (GB)

( * ) Notice: Subject to any disclaimer, the term of this patent is extended or adjusted under 35 U.S.C. 154(b) by 25 days.

(21) Appl. No.: 13/476,312

(22) Filed: May 21, 2012

(65) Prior Publication Data

US 2012/0292452 A1    Nov. 22, 2012

(30) Foreign Application Priority Data

May 20, 2011   (GB) .................................. 1108450.6

(51) Int. Cl.
*B64C 13/16* (2006.01)
(52) U.S. Cl.
USPC ............................ 244/203; 244/215; 244/213
(58) Field of Classification Search
USPC ................................ 244/203, 213–219, 45 R
See application file for complete search history.

(56) References Cited

U.S. PATENT DOCUMENTS

| | | | | |
|---|---|---|---|---|
| 4,498,647 A | * | 2/1985 | Boehringer et al. | 244/99.3 |
| 4,530,271 A | * | 7/1985 | Cronin | 91/509 |
| 4,720,066 A | * | 1/1988 | Renken et al. | 244/213 |
| 4,784,355 A | * | 11/1988 | Brine | 244/213 |
| 6,824,099 B1 | * | 11/2004 | Jones | 244/99.12 |
| 7,159,825 B2 | * | 1/2007 | Seve | 244/203 |
| 7,338,018 B2 | * | 3/2008 | Huynh et al. | 244/215 |
| 7,367,530 B2 | * | 5/2008 | Harrigan et al. | 244/184 |
| 7,607,611 B2 | * | 10/2009 | Wingett et al. | 244/99.3 |
| 8,070,106 B2 | * | 12/2011 | Engelbrecht et al. | 244/215 |
| 2004/0075020 A1 | * | 4/2004 | Trikha | 244/75 R |
| 2004/0245386 A1 | * | 12/2004 | Huynh | 244/75 R |
| 2006/0284022 A1 | * | 12/2006 | Harrigan et al. | 244/203 |
| 2007/0018040 A1 | * | 1/2007 | Wingett et al. | 244/99.4 |
| 2007/0108343 A1 | * | 5/2007 | Wingett et al. | 244/99.3 |
| 2007/0145180 A1 | * | 6/2007 | Johnson et al. | 244/13 |
| 2009/0001225 A1 | * | 1/2009 | Libby | 244/35 R |
| 2010/0187368 A1 | * | 7/2010 | Cathelain et al. | 244/214 |
| 2010/0286849 A1 | * | 11/2010 | Huynh et al. | 701/4 |

(Continued)

FOREIGN PATENT DOCUMENTS

| | | |
|---|---|---|
| EP | 1 785 346 | 5/2007 |
| EP | 1843943 A2 | 10/2007 |
| WO | WO 2011/070347 | 6/2011 |

OTHER PUBLICATIONS

Search Report for GB 1108450.6 dated Aug. 24, 2011.

(Continued)

*Primary Examiner* — Christopher P Ellis
*Assistant Examiner* — Medhat Badawi
(74) *Attorney, Agent, or Firm* — Nixon & Vanderhye P.C.

(57) ABSTRACT

An aircraft wing assembly, comprising: a fixed wing portion; a first and second flight control surfaces; a first and second actuators operatively coupled to the first and second flight control surfaces for moving respective first and second flight control surfaces with respect to the fixed wing portion; a control system operatively coupled to the first and second actuators for controlling movement of the first and second flight control surfaces; and a third actuator selectively engaged with the second flight control surface for engaging and moving the second flight control surface out of a path of movement of the first flight control surface only in the event of a failure in the second actuator or its control, so as to avoid direct contact between the first and second flight control surfaces.

23 Claims, 8 Drawing Sheets

(56) References Cited

U.S. PATENT DOCUMENTS

2010/0320332 A1* 12/2010 Voss et al. .................. 244/217
2011/0290945 A1* 12/2011 Peirce ......................... 244/213
2012/0261517 A1* 10/2012 Turner et al. ................ 244/203

OTHER PUBLICATIONS

European Extended Search Report issued Jul. 2, 2012 in EP 12168617.4-2422.

* cited by examiner

AIRCRAFT WING ASSEMBLY

This application claims priority to GB 1108450.6 filed 20 May 2011, the entire contents of which is hereby incorporated by reference.

FIELD OF THE INVENTION

The present invention relates to an aircraft wing assembly and a method of operating an aircraft wing assembly.

BACKGROUND OF THE INVENTION

A spoiler is a lift dumping device typically provided on the upper aerodynamic surface of an aircraft wing between the main fixed wing and a trailing edge flap. The flap is typically moveable between a retracted position and one or more extended positions for increasing the maximum lift coefficient of the wing. The flap deployment typically comprises a downward deflection, which may be effected by a downward rotary movement and/or a movement in the aft/downward direction with respect to the fixed wing.

A conventional spoiler typically moves between a retracted (0 degree) cruise position and an upwardly extended (positive rotation angle) lift dump position. A so-called "droop spoiler" can also be moved to a downwardly extended (negative rotation angle) drooped position when the flap is partially or fully deployed, so as to manage a gap between the spoiler and the flap. Managing this gap can significantly improve the aerodynamic performance of the wing in a high lift configuration.

Legacy aircraft with a drooping spoiler configuration may have a mechanical linkage between the spoiler and flap, such that the drooping motion of the spoiler and flap are synchronised. This mechanical linkage adds unnecessary weight. Fly-by-wire control systems on modern aircraft allow for independent actuation of the spoiler and flap actuators with control rules to link the flap and spoiler movement.

Under normal operation, the control systems effectively manage the flap and spoiler motion. However, in the event of failure of the spoiler actuator, or its control system, the spoiler could remain in its drooped position whilst the flap is being retracted. Since the drooped spoiler partially occupies the position vacated by the deployed flap there exists the possibility that an attempt to fully retract the flap following this spoiler actuator/control failure may cause a clash between the leading edge of the retracting flap and the trailing edge of the drooped spoiler, which is highly undesirable.

EP1843943 proposes a solution in which the spoiler and flap movement is configured such that the retracting flap will contact the underside of the drooped spoiler following a spoiler control failure, and by direct mechanical contact the retracting flap will move the spoiler from its drooped position to its cruise (0 degree) position accompanied by back-driving the spoiler actuator.

Whilst the solution presented in EP1843943 may be adequate under some circumstances it does not allow for a flap and spoiler configuration in which the retracting flap could contact the spoiler trailing edge "end-on", which could cause a jam between the flap and spoiler, thus preventing the flap retraction, and possible damage to the spoiler and/or flap.

SUMMARY OF THE INVENTION

A first aspect of the invention provides an aircraft wing assembly, comprising: a fixed wing portion; a first flight control surface; a first actuator operatively coupled to the first flight control surface for moving the first flight control surface with respect to the fixed wing portion; a second flight control surface disposed adjacent the first flight control surface; a second actuator operatively coupled to the second flight control surface for moving the second flight control surface with respect to the fixed wing portion; a control system operatively coupled to the first and second actuators for controlling movement of the first and second flight control surfaces; and a third actuator selectively engaged with the second flight control surface for engaging and moving the second flight control surface out of a path of movement of the first flight control surface only in the event of a failure in the second actuator or its control, so as to avoid direct contact between the first and second flight control surfaces.

A further aspect of the invention provides a method of operating an aircraft wing assembly, comprising: providing a first actuator configured to move a first flight control surface with respect to a fixed wing portion; providing a second actuator configured to move a second flight control surface with respect to the fixed wing portion, wherein the second flight control surface is disposed adjacent the first flight control surface; controlling the first and second actuators to move the first and second flight control surfaces during normal operation; and using a third actuator to selectively engage with and move the second flight control surface out of a path of movement of the first flight control surface only in the event of a failure in the second actuator or its control, so as to avoid direct contact between the first and second flight control surfaces.

The invention is advantageous in that the third actuator is operable to displace the failed second flight control surface out of a path of movement of the first flight control surface thereby avoiding a scenario in which the first flight control surface could directly contact the second flight control surface, which may otherwise cause a jam between the first and second flight control surfaces, preventing movement of the first flight control surface, and damage to the first and/or second flight control surfaces.

The third actuator may be hydraulically driven.

The third actuator may be operatively coupled to the first flight control surface.

In particular, the third actuator may be a slave cylinder hydraulically coupled to a master cylinder driven by movement of the first flight control surface.

Alternatively, the third actuator may be mechanically and/or electrically driven.

The second actuator is preferably capable of being back-driven without damage to the second actuator, i.e. it is configured to be a "back-driveable" actuator.

The second actuator may be hydraulically driven. The hydraulic actuator may include a release valve configured to release a force applied to the second flight control surface. The release valve may provide the "back-driveable" characteristic of the actuator. In particular, the release valve may be a maintenance valve.

The release valve may be operatively coupled to the third actuator and configured to release a force applied to the second flight control surface when the third actuator is engaged to move the second flight control surface. In particular, the release valve may be moveable between open and closed positions by a slave cylinder hydraulically coupled to a master cylinder driven by movement of the third actuator when the third actuator is engaged to move the second flight control surface.

Alternatively, the second actuator may be mechanically and/or electrically driven.

In one implementation, the first flight control surface is a trailing edge flap. The flap may be moveable between a retracted position and at least one extended position with respect to the fixed wing portion.

The second flight control surface may be a spoiler. The flap is preferably disposed directly aft of the spoiler in the wing chord-wise direction. The spoiler may be moveable between a retracted position in which the spoiler conforms to a profile of the aircraft wing, at least one upwardly rotated position, and at least one downwardly rotated position. Such a spoiler is conventionally known as a "droop" spoiler.

The control system may be configured to manage a gap between a trailing edge of the spoiler and a leading edge of the flap when the flap is in its extended position and the spoiler is in its downwardly rotated (drooped) position. Management of this gap can lead to improved aerodynamic performance of the wing in a high-lift configuration. The flap and spoiler have no fixed mechanical linkage between them. Preferably, the control system is a "fly-by-wire", or "fly-by-light", control system.

The spoiler may occupy a space vacated by the flap when the flap and spoiler are deployed in a high-lift configuration. Accordingly, the third actuator is preferably configured to move the spoiler from its downwardly rotated (drooped or zero degree) position to its retracted position following failure of the second actuator or its control. This will then clear the way for the flap to retract.

The third actuator is preferably disengaged from the second flight control surface during normal operation.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
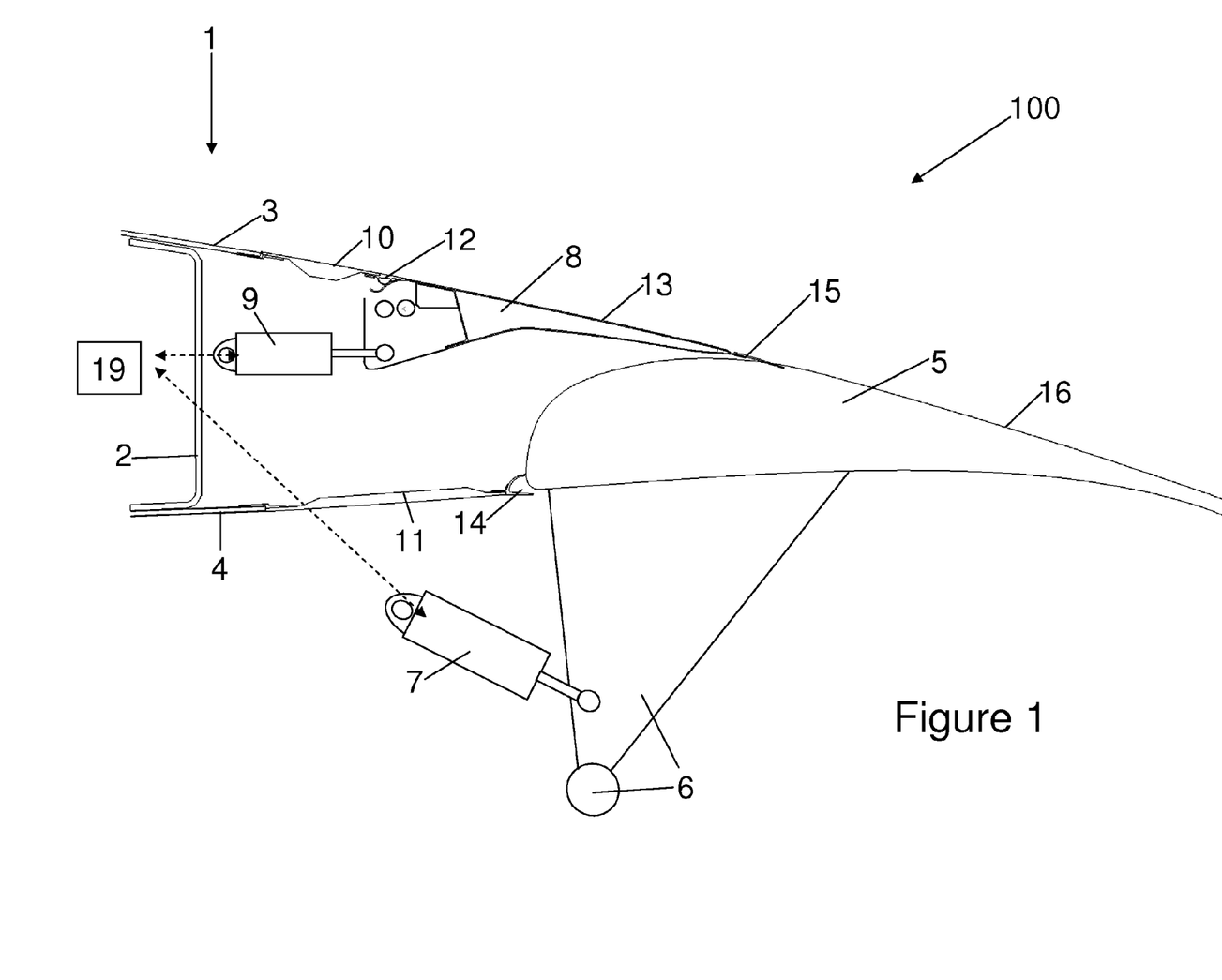
FIG. 1 illustrates a schematic view of a comparative example of an aircraft wing assembly that does not form part of this invention, which includes a fixed wing portion, a trailing edge drop hinge single flap and a spoiler, in a cruise configuration with the spoiler and flap both in a retracted position.

FIG. 1 shows a schematic chord-wise cross sectional view through the aft portion of a comparative example of an aircraft wing assembly 100 that does not form part of this invention. The aircraft wing assembly 100 includes a fixed wing portion 1 having a conventional wing box construction with a rear spar 2, an upper wing cover 3 and a lower wing cover 4.

A trailing edge single flap 5 is pivotally attached to the fixed wing portion 1 by a drop hinge mechanism 6. The flap 5 is moveable between a retracted position (shown in FIG. 1) and at least one extended position with respect to the fixed wing portion by means of an hydraulic flap actuator 7. The drop hinge mechanism 6 may be housed within a fairing (not shown).

A spoiler 8 is pivotally to the fixed wing portion 1. The spoiler 8 is moveable between a retracted position (shown in FIG. 1), at least one upwardly extended (positive rotation angle) position, and at least one downwardly extended (negative rotation angle) drooped position by means of an hydraulic spoiler actuator 9.

An upper panel 10 extends aft from the trailing edge of the upper wing cover 3, and a lower panel 11 extends aft from the trailing edge of the lower wing cover 3. The panels 10, 11 may be removable to allow for maintenance access. A seal 12 extends to seal between the upper panel 10 and an upper aerodynamic surface 13 of the spoiler 8 when the spoiler is retracted. A seal 14 extends to seal between the lower panel 11 and a lower aerodynamic surface of the flap 5 when the flap is retracted.

FIG. 1 illustrates the aircraft wing assembly in a cruise configuration with the flap 5 and the spoiler 8 both in a substantially retracted position. The spoiler 8 has a trailing edge 15 that substantially seals against an upper aerodynamic surface 16 of the retracted flap 5. In the cruise configuration the upper aerodynamic surface 13 of spoiler 8 forms a substantially continuous aerodynamic surface with the outer surface of the upper wing cover 3 and the upper surface 16 of flap 5. The spoiler may be a spoileron in which case it may be configured to perform small positive angle upward deflections for roll control of the aircraft during cruise. In the cruise configuration the flap 5 is in its fully retracted (0 degree) position. The flap may be configured to perform small positive and negative angle deflections for varying the camber of the wing during cruise.

Figure 2:
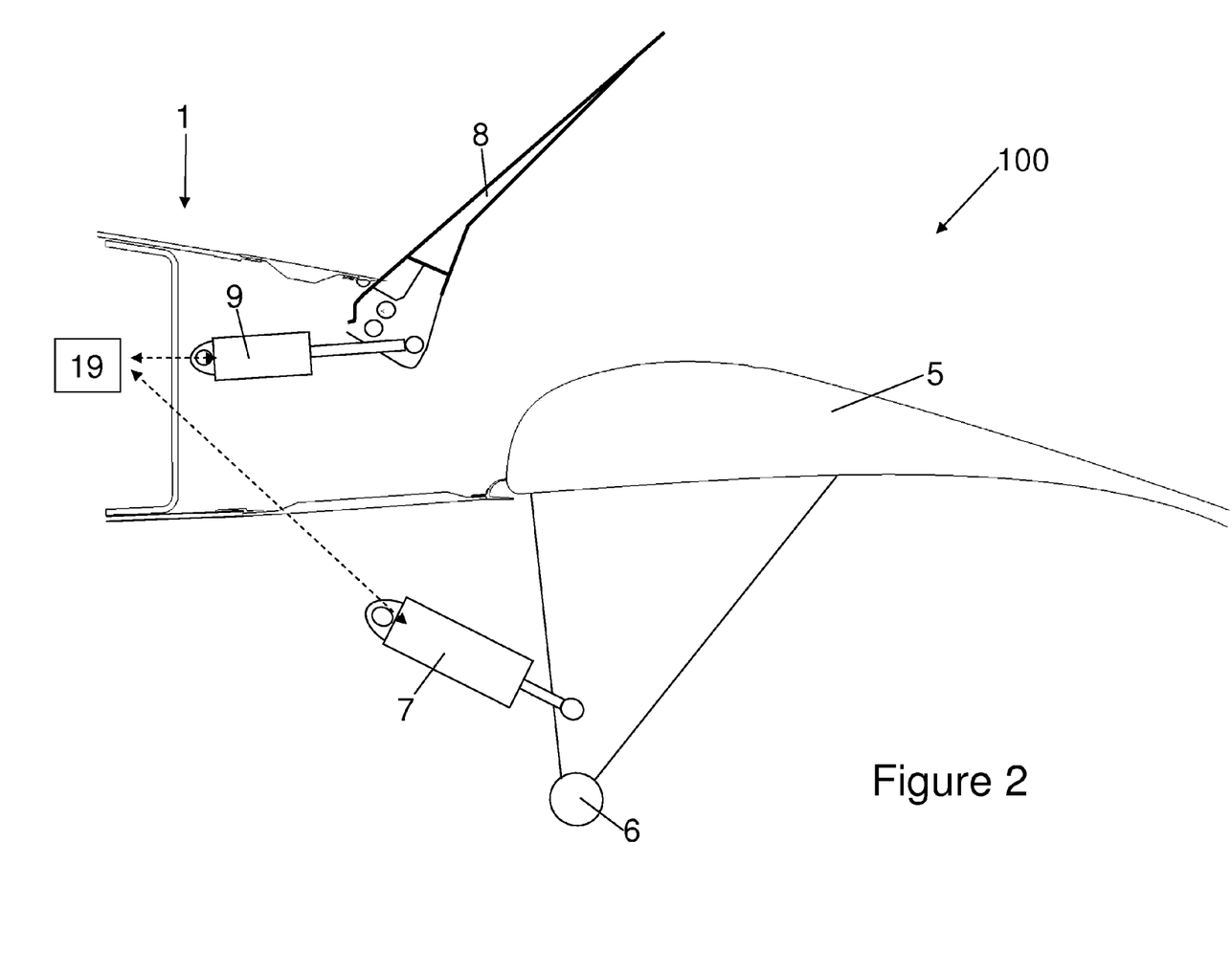
FIG. 2 illustrates the aircraft wing assembly of FIG. 1 in a braking configuration with the spoiler deflected upwardly and the flap retracted.

FIG. 2 illustrates the aircraft wing assembly 100 in a "lift dump" configuration with the spoiler 8 at least partially deployed to an upwardly rotated (positive angle) position and with the flap 5 retracted. Movement of the spoiler is effected by the spoiler actuator 9. The lift dump configuration may be used to descend the aircraft to a lower altitude when an increase in airspeed is undesirable (e.g. to descend rapidly from cruise altitude in an emergency). During landing, the spoiler 8 may be fully deployed to its most upwardly rotated position (approximately positive 50 to 60 degrees) and the flap 5 may be fully extended to achieve maximum aerodynamic braking effect.

Figure 3:
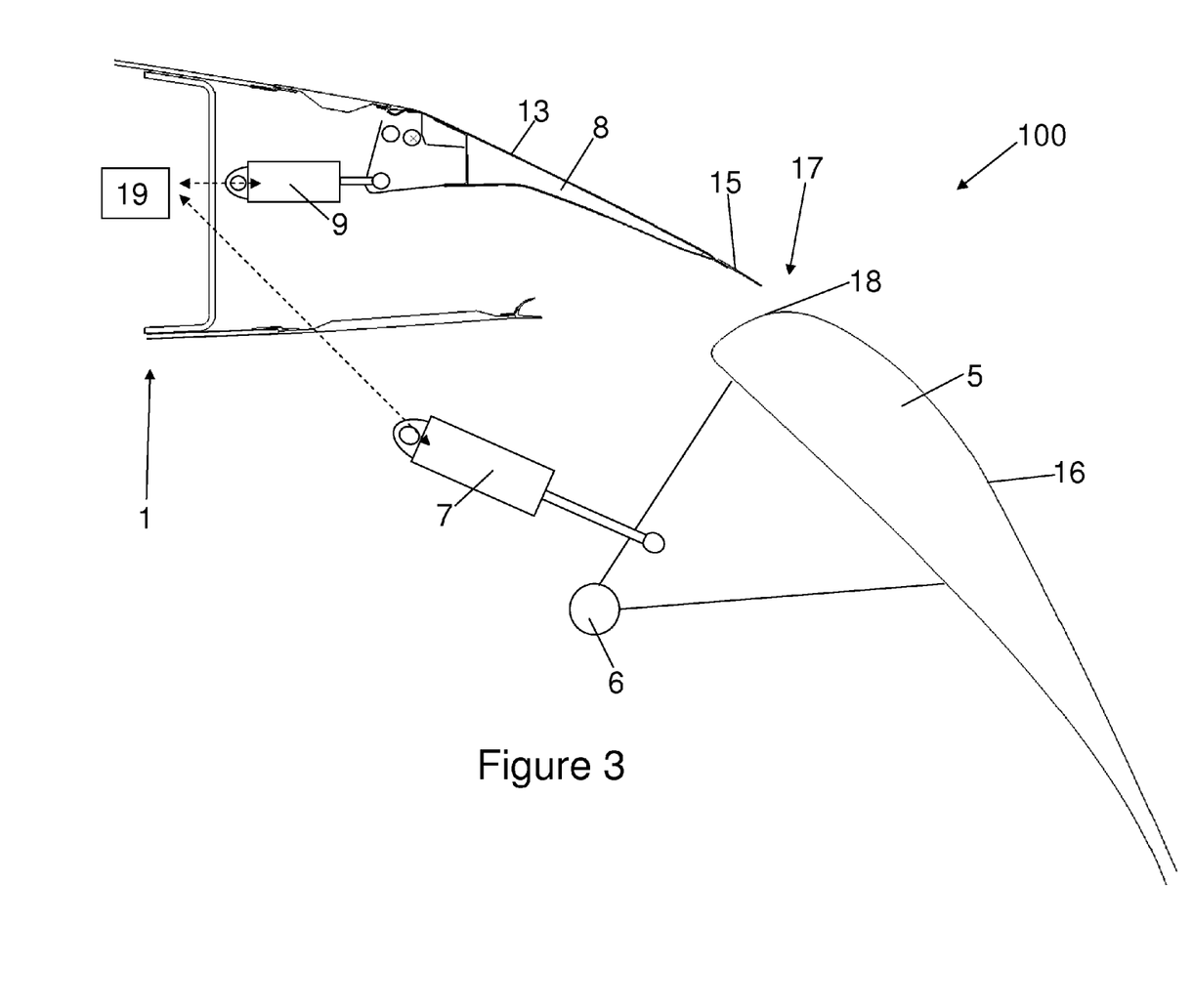
FIG. 3 illustrates the aircraft wing assembly of FIG. 1 in a high-lift configuration with the flap at least partially deployed and the spoiler deflected downwardly (drooped)

FIG. 3 illustrates the aircraft wing assembly 100 in a high-lift configuration with the flap 5 at least partially extended and the spoiler 8 at least partially deployed to a downwardly rotated (negative angle) drooped position.

Movement of the spoiler 8 is effected by the spoiler actuator 9. Movement of the flap 5 is effected by the flap actuator 7. A gap 17 between the spoiler trailing edge 15 and the flap leading edge 18 is managed so as to optimise the aerodynamic performance of the aircraft wing assembly 100 in the high lift configuration. Managing the size of the gap 17 controls the amount of airflow which passes from the lower aerodynamic surface to the upper aerodynamic surface of the wing assembly so as to promote attachment of the airflow over the flap 5. In addition, rotating the spoiler 8 downwardly to a drooped position directs the airflow over the upper aerodynamic surface of the wing assembly.

The spoiler 8 may be moved between a plurality of drooped spoiler positions each selected so as to optimise the aerodynamic performance of the wing assembly according to a respective plurality of flap positions. Alternatively, if the flap 5 is moveable to a single extended position then the spoiler 8 may similarly be moveable to a corresponding single drooped position.

Movement of the flap 5 and spoiler 8 between their retracted positions and the one or more high lift configurations may be controlled so as to manage the size of the gap 17 between the spoiler trailing edge 15 and the flap leading edge 18 throughout the movement of the flap 5.

As can be seen from FIGS. 1 to 3, the flap actuator 7 and the spoiler actuator 9 are operatively coupled to a control system 19.

The flap 5 and spoiler 8 have no fixed mechanical linkage between them such that the flap and spoiler motion is not mechanically tied. However, as explained above, the flap 5 and spoiler 8 are configured to move under the direction of the control system 19 in a coordinated manner so as to provide a desired array of flight control surface positions for a variety of flight and ground movement configurations of the aircraft. The control system 19 is a "fly by wire" control system configured to transfer electromagnetic signals between a controller and at least the flap actuator 7 and the spoiler actuator 9 based upon one or more inputs (e.g. a pilot input, within parameters allowed by the flight computer).

As can be seen from FIG. 3, the spoiler 8 occupies a space vacated by the deployed flap 5 when the spoiler 8 is in its drooped position. Accordingly, coordinated movement of the spoiler 8 and flap 5 under direction of the control system 19 during normal operation allows the flap 5 to be fully retracted without interfering with the spoiler 8.

Figure 4:
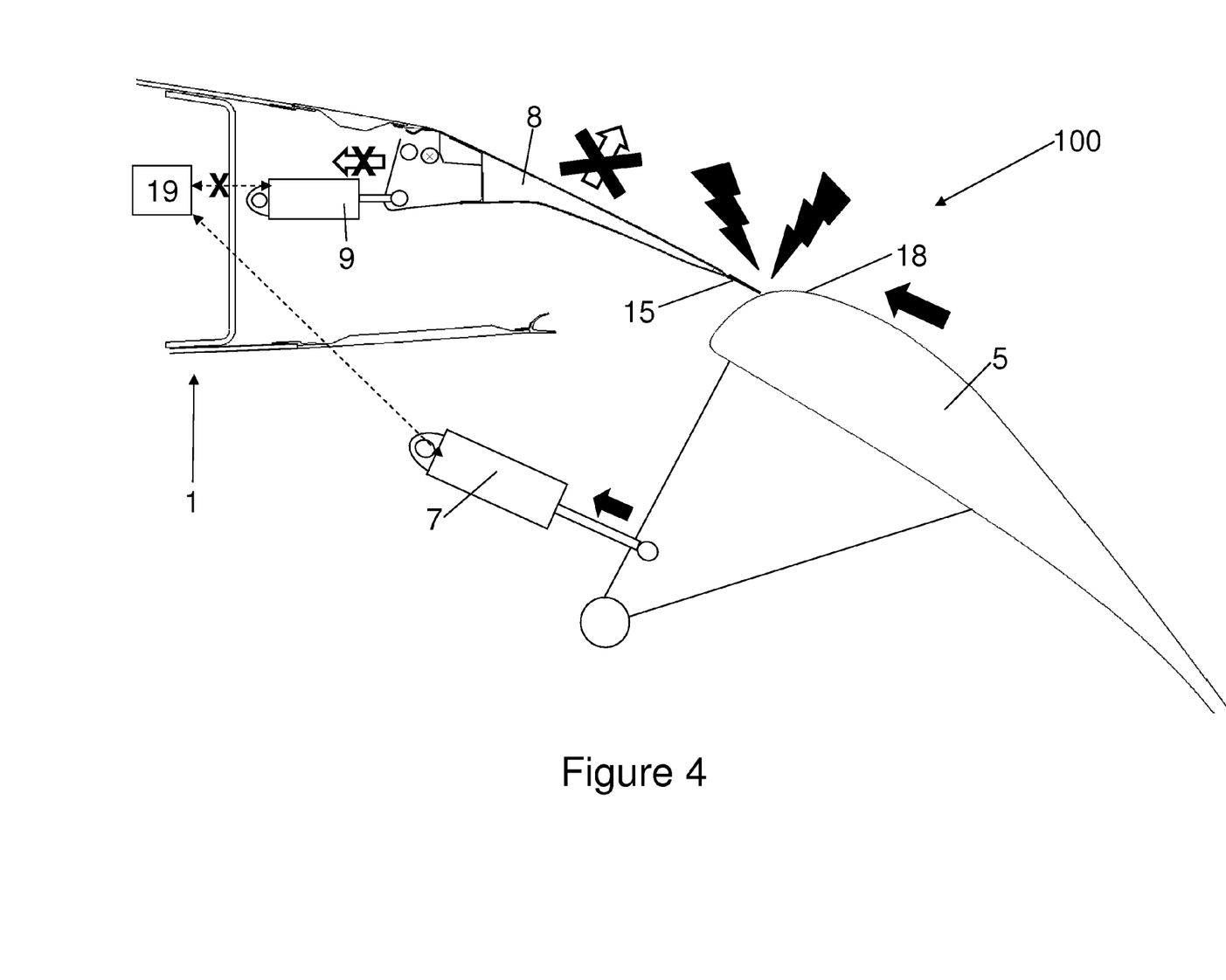
FIG. 4 illustrates the aircraft wing assembly of FIG. 1 during retraction of the flap and spoiler from the high-lift configuration but where a spoiler actuator/control failure has occurred such that the spoiler remains in its drooped position and illustrating the potential clash between the flap leading edge and the spoiler trailing edge.

In the event of a failure in the spoiler actuator 9, or a failure in transmitting an appropriate control signal to the spoiler actuator 9 by the control system 19, then there is a possibility that the spoiler 8 may remain in its drooped position whilst the flap actuator 7 continues to be appropriately directed by the control system 19 to retract the flap 5 from its extended position. As can be seen from FIG. 4, this could cause the flap leading edge 18 to strike the spoiler trailing edge 15 "end on", which could cause a jam between the flap 5 and spoiler 8, thus preventing the flap retraction, and possible damage to the spoiler 8 and/or flap 5. Such a clash between the flap 5 and the spoiler 8 is highly undesirable.

Figure 5:
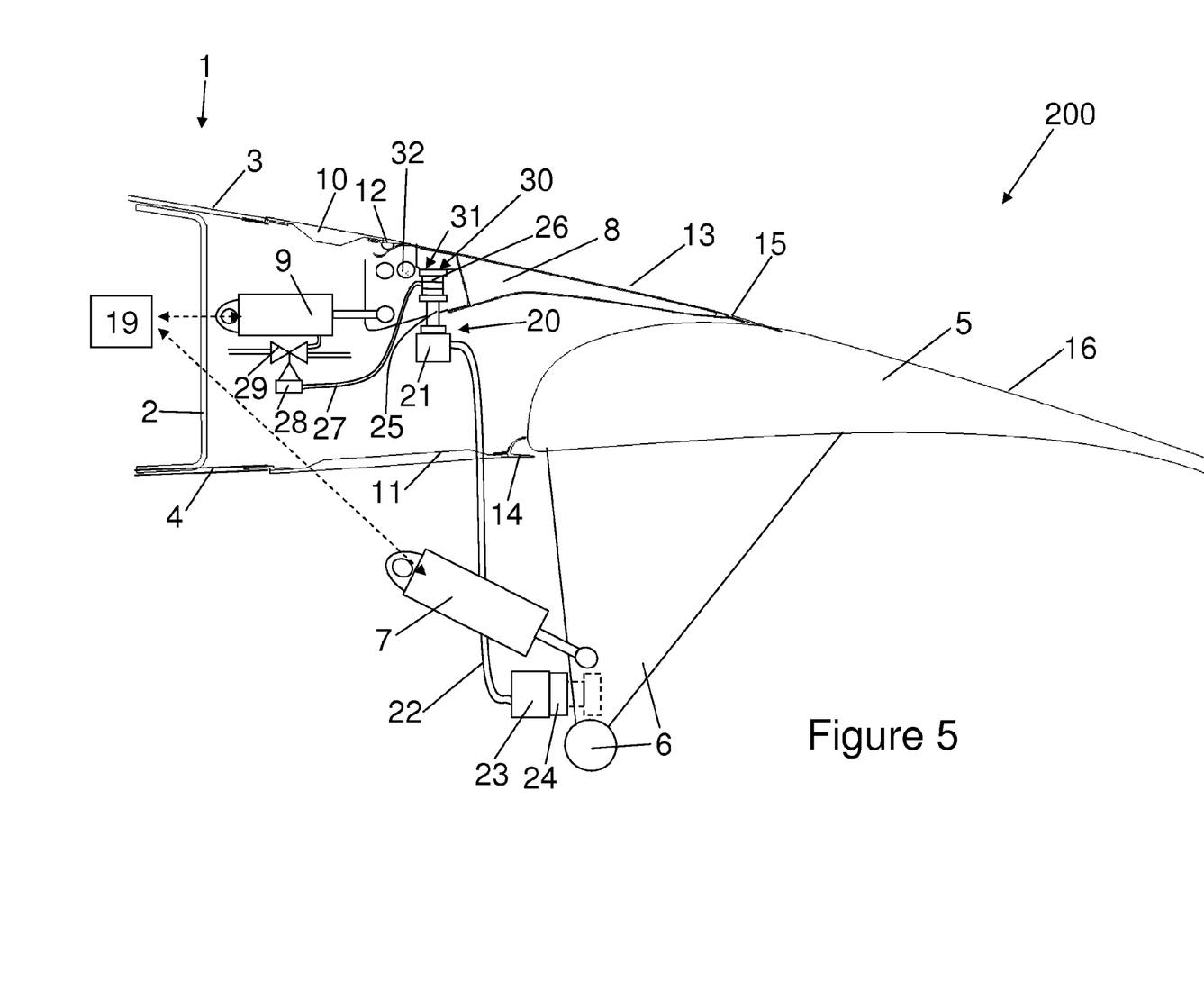
FIG. 5 illustrates a schematic view of an aircraft wing assembly according to this invention, which further includes a redundant spoiler actuator, in a cruise configuration with the spoiler and flap both in a retracted position.

FIG. 5 shows a schematic chord-wise cross section view through the aft portion of an aircraft wing assembly 200 according to an embodiment of this invention. The aircraft wing assembly 200 is similar to the aircraft wing assembly 100 in many respects and like reference numerals have been used to denote like parts with the aircraft wing assembly 100. Accordingly, only the additional features of the aircraft wing assembly 200 will be described in detail below. The aircraft wing assembly 200 includes the same flap 5 and spoiler 8 moveable under the direction of the same flap actuator 7 and spoiler actuator 9, respectively, which are coupled to the same control system 19 for controlling movement of the flap 5 and spoiler 8.

The aircraft wing assembly 200 further includes a redundant secondary spoiler actuator 20 selectively engaged with the spoiler 8 for engaging and moving the spoiler. In the embodiment shown in FIG. 5, the redundant spoiler actuator 20 is a primary slave hydraulic cylinder 21 hydraulically coupled by hydraulic line 22 to a primary master cylinder 23.

The primary master cylinder 23 is fixed with respect to the fixed wing portion 1 and disposed adjacent the flap drop hinge mechanism 6. The primary master cylinder 23 includes a piston 24 moveable between a first (retracted) position and a second (extended) position. The primary master cylinder piston 24 is operatively coupled to the flap drop hinge mechanism 6.

The primary slave cylinder 21 is fixed with respect to the fixed wing portion 1 and includes a primary slave cylinder piston 25 selectively engaged with the spoiler 8. That is to say, the piston 25 is not coupled at all times to the spoiler 8 but instead acts to selectively engage with the spoiler 8 under particular circumstances, which will be described in detail below.

The primary slave cylinder piston 25 is directly coupled to a secondary master cylinder 26, which is hydraulically coupled via hydraulic line 27 to a secondary slave cylinder 28. The secondary slave cylinder 28 is operatively coupled to a maintenance release valve 29 of the spoiler actuator 9. The maintenance release valve 29 is configured to release a force applied by the spoiler actuator 9 to the spoiler 8 and may be a conventional standard fit item found in many hydraulic actuators. The secondary master cylinder 26 is connected at one side to the primary slave cylinder piston 25 and its opposite side forms an abutment surface 30 for engaging with a contact surface 31 of the spoiler 8.

Operation of the redundant spoiler actuator 20 will now be described in detail with reference to FIGS. 5 to 8. FIG. 5 illustrates the aircraft wing assembly 200 in its cruise configuration, with the flap 5 and spoiler 8 in their retracted positions in an identical manner to that described above with reference to the assembly 100 of FIG. 1.

In the cruise configuration shown in FIG. 5, the flap drop hinge mechanism 6 bears against the primary master cylinder piston 24 so as to force the piston 24 to its fully retracted position, which in turn causes the primary slave cylinder piston 25 to be in its fully extended position. The spoiler 8 is in its retracted position as correctly set by the spoiler actuator 9 under the direction of the control system 19.

With the primary slave cylinder piston 25 fully extended the abutment surface 30 of the secondary master cylinder 26 just contacts the contact surface 31 of spoiler 8 but importantly does not apply any upward force on the spoiler 8. Accordingly, the redundant spoiler actuator 20 does not interfere in any way with the setting of the spoiler 8 which is dictated entirely by the correctly functioning spoiler actuator 9 under the direction of the control system 19. Since the secondary master cylinder 26 does not impart any load on the spoiler 8 there is a relatively low pressure within hydraulic line 27, which corresponds to a closed position of the spoiler actuator maintenance release valve 29 as directed by the secondary slave cylinder 28.

Figure 6:
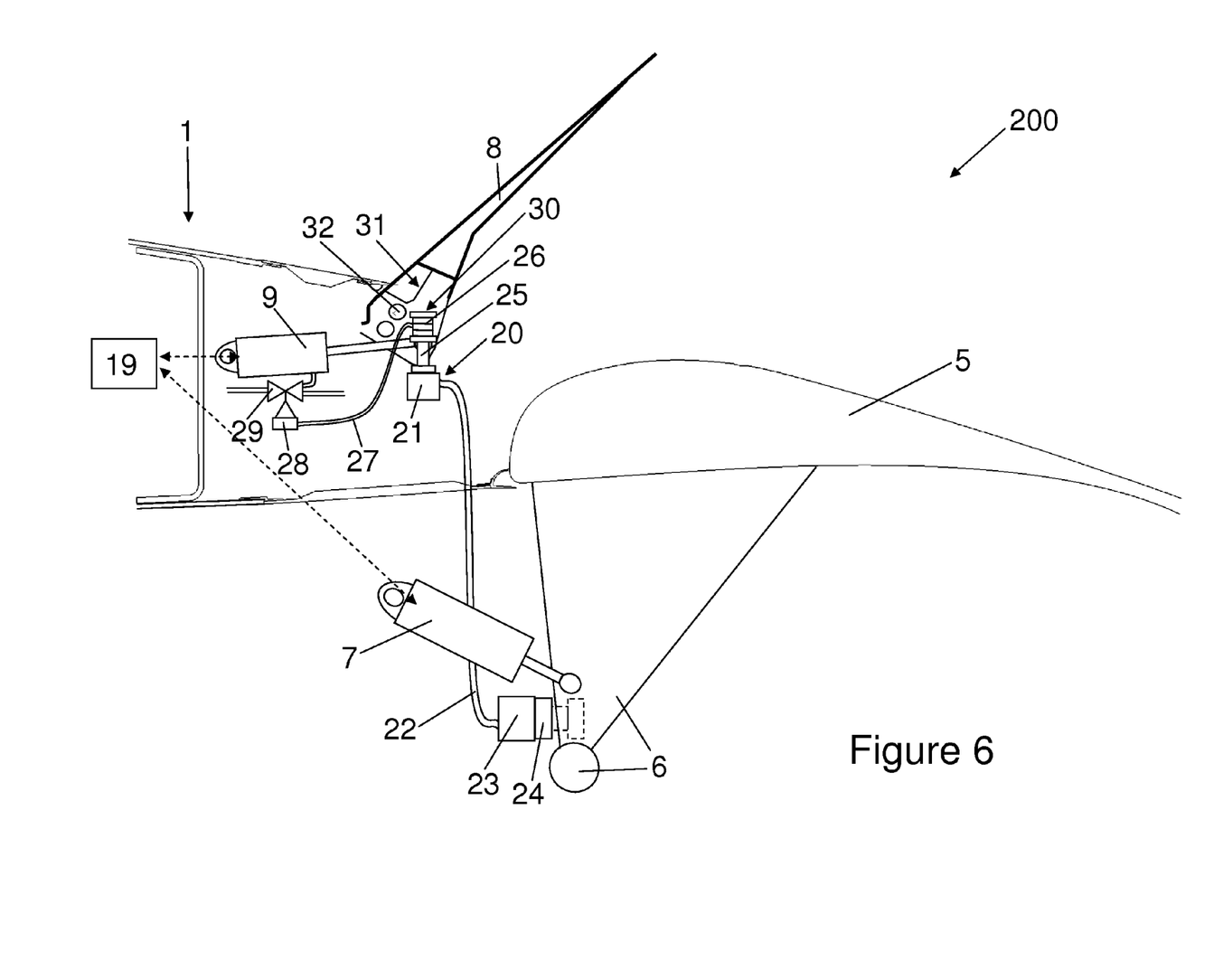
FIG. 6 illustrates the aircraft wing assembly of FIG. 5 in a braking configuration with the spoiler deflected upwardly and the flap retracted.

FIG. 6 indicates the spoiler 8 in an upwardly rotated position and with the flap 5 in its fully retracted position in an identical manner to that described above with reference to the assembly 100 of FIG. 2. It can be seen that the redundant spoiler actuator 20 is not engaged with the spoiler 8 and there is a gap between the abutment surface 30 and the contact surface 31. The movement of spoiler 8 to its upwardly rotated position is controlled by correctly functioning spoiler actuator 9 under the direction of the control system 19.

Since the flap 5 is in its fully retracted position under the direction of control system 19 and flap actuator 7, the primary master cylinder piston 24 remains in its retracted position which causes a positive pressure within hydraulic line 22 such that the primary slave cylinder piston 25 remains in its extended position. Since the abutment surface 30 of the secondary slave cylinder 26 is not engaged with the contact surface 31 of the spoiler 8, the redundant spoiler actuator 20 imposes no force on the spoiler 8 and the hydraulic pressure within hydraulic line 27 remains low such that the spoiler actuator maintenance release valve 29 remains closed. As can be seen from FIG. 6 the redundant actuator 20 plays no part in moving the spoiler 8 between its retracted and upwardly rotated positions which are effected by the spoiler actuator 9 under the direction of control system 19. Similarly, the redundant spoiler actuator 20 has no influence over the setting of the maintenance release valve 29 of the spoiler actuator 9 during normal operation of the spoiler actuator 9 to control the spoiler 8 between its retracted and upwardly rotated positions.

Although not shown in FIG. 6, it will be appreciated that if the control system 19 directs the flap actuator 7 to move the flap 5 to one or more extended positions whilst the spoiler 8 is deployed to its upwardly rotated position, the primary master cylinder piston 24 will move to an extended position thus causing the primary slave cylinder piston 25 of the redundant spoiler actuator 20 to retract. However, since the redundant spoiler actuator 20 is not engaged with the spoiler 8, movement of the redundant spoiler actuator 20 has no effect upon the positioning of the spoiler 8 which is controlled by spoiler actuator 9 under direction of the control system 19. Similarly, retraction of the primary slave cylinder piston 25 does not impose any hydraulic load on the secondary master cylinder 26 and so movement of the spoiler actuator 20 has no influence on the setting of the maintenance release valve 29 which therefore remains closed.

Figure 7:
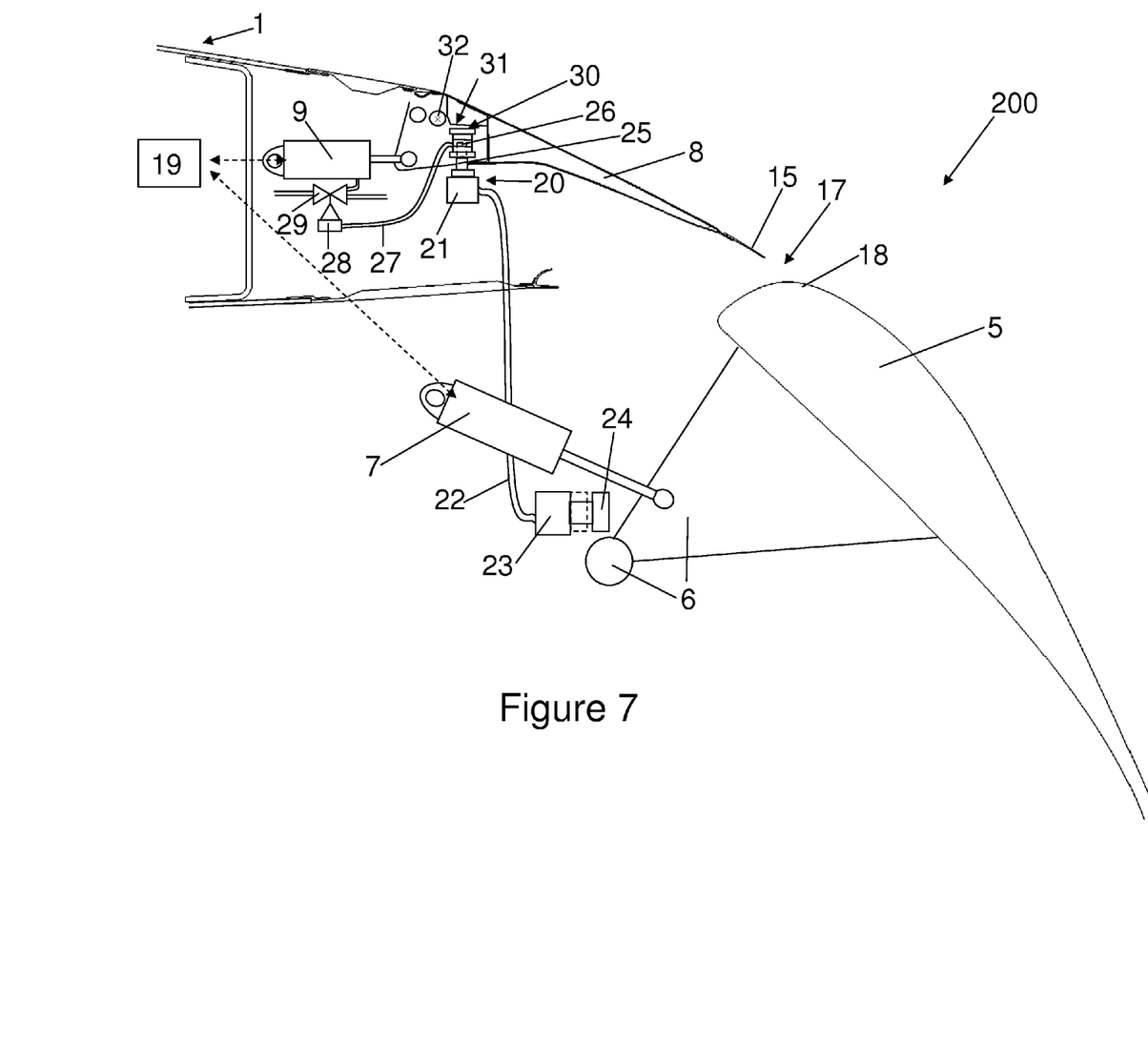
FIG. 7 illustrates the aircraft wing assembly of FIG. 5 in a high-lift configuration with the flap at least partially deployed and the spoiler deflected downwardly (drooped)

FIG. 7 illustrates the aircraft wing assembly 200 in a high lift configuration with the flap 5 extended and the spoiler 8 moved to a downwardly rotated drooped position in an identical manner to that described above with reference to the assembly 100 of FIG. 3. The drooped position of spoiler 8 is controlled by spoiler actuator 9 depending upon the extent of deployment of flap 5. The control system 19 may include, for example, a flap position sensor (not shown) for verifying the position of the flap 5 such that the gap 17 between the spoiler trailing edge 15 and the flap leading edge 18 is optimised for the selected high lift configuration.

As can be seen from FIG. 7, when the flap 5 is moved to its extended position, the piston 24 of the primary master cylinder 23 is extended which causes the redundant spoiler actuator 20 to move to its retracted position by retraction of primary slave cylinder piston 25. Retraction of the redundant spoiler actuator 20 ensures that the abutment surface 30 of the secondary master cylinder 26, which is coupled to piston 25, is not engaged with the contact surface 31 of spoiler 8. In this way, it can be ensured that the redundant spoiler actuator 20 does not impart any upward load upon the spoiler 8 and the drooped position of spoiler 8 is correctly controlled by the spoiler actuator 9 under the direction of the control system 19.

Under normal operation of the control system 19 the flap actuator 7 and the spoiler actuator 9 will control the flap 5 and spoiler 8 positions based on various inputs (e.g. pilot input). However, if the spoiler actuator 9 fails, or if the control system 19 fails to provide an appropriate control signal to the spoiler actuator 9, then the redundant spoiler actuator 20 is operable to avoid a clash between the flap 5 and the spoiler 8.

Figure 8:
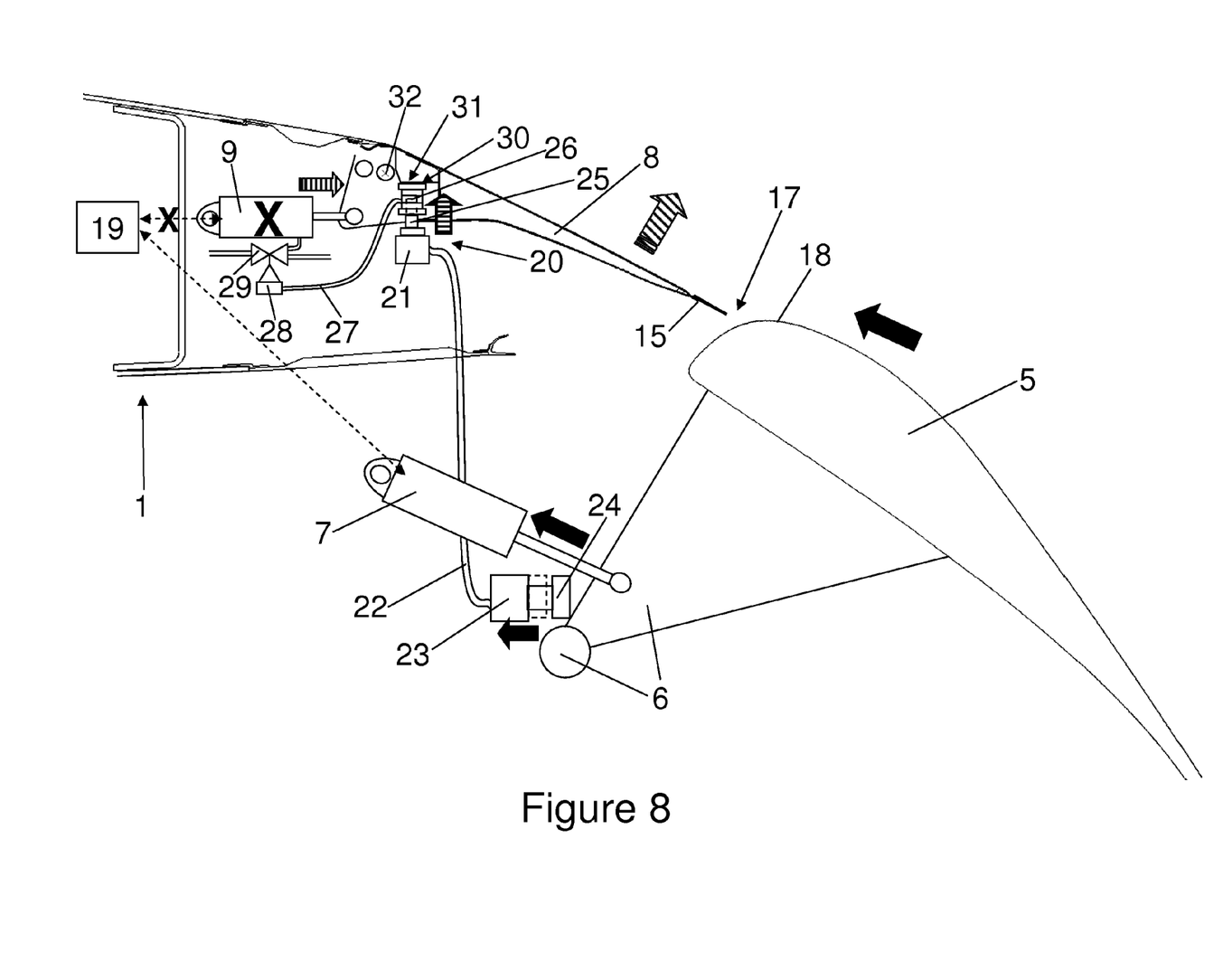
FIG. 8 illustrates the aircraft wing assembly of FIG. 5 during retraction of the flap and spoiler from the high-lift configuration where a primary spoiler actuator/control failure has occurred and the redundant spoiler actuator drives the spoiler upwardly out of the path of the retracting flap accompanied by back-driving of the primary spoiler actuator.

Turning to FIG. 8, it can be seen that when the flap 5 and spoiler 8 are deployed in a high lift configuration and the control system 19 demands a retraction of the flap 5 but there is some failure in either the spoiler actuator 9 or the control signal to the spoiler actuator 9, then the spoiler 8 will remain in its drooped position until the gap 17 between the spoiler trailing edge 15 and the flap leading edge 18 reaches a predetermined minimum separation distance. At this point, the flap drop hinge mechanism 6 will contact the primary master cylinder piston 24 and begin to force the retraction of piston 24 into the primary master cylinder 23. The hydraulic pressure carried by hydraulic line 22 causes the primary slave cylinder piston 25 of the redundant spoiler actuator 20 to extend upwardly. Since the secondary master cylinder 26 is coupled to the primary slave cylinder piston 25, the abutment surface 30 of the secondary master cylinder 26 moves into engagement with the contact surface 31 of the spoiler 8.

Continued retraction of the flap 5 causes the redundant spoiler actuator 20 to compress the fluid volume within the secondary master cylinder 26 which causes an increase in pressure in hydraulic line 27 and actuation of the secondary slave cylinder 28 to open the maintenance release valve 29 of the failed spoiler actuator 9. Opening the maintenance release valve 29 causes the failed spoiler actuator 9 to release the force it applies to the spoiler 8 and becomes back-driveable.

As retraction of the flap 5 continues the redundant spoiler actuator 20 exerts an upward load on the contact surface 31 of the spoiler 8 via the secondary master cylinder 26 which causes an upward rotation of the spoiler 8 about its hinge axis 32 so as to move the spoiler 8 from its downwardly drooped (negative angle) position towards its neutral (zero degree) "cruise" position. Since the spoiler 8 remains operatively coupled to the failed spoiler actuator 9 the spoiler actuator 9 is back-driven by the redundant spoiler actuator 20 thanks to an equalization of hydraulic pressure across the failed spoiler actuator 9 due to opening of the maintenance release valve 29.

By driving the spoiler 8 using the redundant spoiler actuator 20 during retraction of the flap 5 following a failure of the spoiler actuator 9, or its control, the spoiler 8 is moved out of the path of movement of the flap 5 so as to avoid any direct contact between the flap 5 leading edge 18 and the spoiler 8 trailing edge 15. This allows flap 5 to be fully retracted under normal operation of the flap actuator 7 as directed by the control system 19. By avoiding any direct contact between the flap 5 and the spoiler 8, even if the spoiler actuator 9 fails when the spoiler 8 is in its drooped position, it becomes possible to reliably fully retract the flap 5 and ensure that no damage to either the flap or the spoiler 8 occurs.

Whilst in the embodiment described above the flap actuator 7 is an hydraulic actuator it will be appreciated that the flap actuator may alternatively be mechanically and/or electrically driven. Likewise, whilst in the embodiment described above the spoiler actuator 9 is an hydraulic actuator it will be appreciated that the spoiler actuator 9 may be mechanically and/or electrically driven. In this case, the spoiler actuator may include a mechanical release feature to make the spoiler actuator back-drivable instead of the maintenance release valve.

Furthermore, whilst the redundant spoiler actuator 20 in the embodiment described above is an hydraulic master/slave cylinder combination the redundant spoiler actuator may be mechanically and/or electrically driven. For example, a position sensor may be used to determine retraction of the flap 5 whilst the spoiler 8 is in a drooped position and this position indication may be used in a control loop to drive the redundant electrical mechanical spoiler actuator to rotate the spoiler 8 upwardly towards its neutral position so as to clear the path for the flap 5 to fully retract. These and other variants of the invention will be apparent to those persons skilled in the art.

Whilst in the above described embodiment the invention is applied to a flap and spoiler combination at the trailing edge of an aircraft wing it will be appreciated that this invention could also be applied to other flight control surfaces, such as a spoileron or a flaperon, for example.

Although the invention has been described above with reference to one or more preferred embodiments, it will be appreciated that various changes or modifications may be made without departing from the scope of the invention as defined in the appended claims.

The invention claimed is:

1. An aircraft wing assembly, comprising:
    a fixed wing portion;
    a first flight control surface;
    a first actuator operatively coupled to the first flight control surface for moving the first flight control surface with respect to the fixed wing portion;
    a second flight control surface disposed adjacent the first flight control surface;
    a second actuator operatively coupled to the second flight control surface for moving the second flight control surface with respect to the fixed wing portion;
    a control system operatively coupled to the first and second actuators for controlling movement of the first and second flight control surfaces; and
    a third actuator selectively engaged with the second flight control surface for engaging and moving the second flight control surface out of a path of movement of the first flight control surface only in the event of a failure in the second actuator or its control, so as to avoid direct contact between the first and second flight control surfaces.

2. An assembly according to claim 1, wherein the third actuator is hydraulically driven.

3. An assembly according to claim 1, wherein the third actuator is operatively coupled to the first flight control surface.

4. An assembly according to claim 3, wherein the third actuator is a slave cylinder hydraulically coupled to a master cylinder driven by movement of the first flight control surface.

5. An assembly according to claim 1, wherein the third actuator is mechanically and/or electrically driven.

6. An assembly according to claim 1, wherein the second actuator is back-driveable.

7. An assembly according to claim 1, wherein the second actuator is hydraulically driven.

8. An assembly according to claim 6, wherein the second actuator includes a release valve configured to release a force applied to the second flight control surface.

9. An assembly according to claim 8, wherein the release valve is a maintenance valve.

10. An assembly according to claim 8, wherein the release valve is operatively coupled to the third actuator and is configured to release a force applied to the second flight control surface when the third actuator is engaged to move the second flight control surface.

11. An assembly according to claim 10, wherein the release valve is moveable between open and closed positions by a slave cylinder hydraulically coupled to a master cylinder driven by movement of the third actuator when the third actuator is engaged to move the second flight control surface.

12. An assembly according to claim 1, wherein the second actuator is mechanically and/or electrically driven.

13. An assembly according to claim 1, wherein the first flight control surface is a trailing edge flap.

14. An assembly according to claim 13, wherein the flap is moveable between a retracted position and at least one extended position with respect to the fixed wing portion.

15. An assembly according to claim 1, wherein the second flight control surface is a spoiler.

16. An assembly according to claim 15, wherein the spoiler is moveable between a retracted position in which the spoiler conforms to a profile of the aircraft wing, at least one upwardly rotated position, and at least one downwardly rotated position.

17. An assembly according to claim 14, wherein the control system is configured to manage a gap between a trailing edge of the spoiler and a leading edge of the flap when the flap is in its extended position and the spoiler is in its downwardly rotated position.

18. An assembly according to claim 16, wherein the third actuator is operable to move the spoiler from its downwardly rotated position to its retracted position.

19. A method of operating an aircraft wing assembly, comprising:
    providing a first actuator configured to move a first flight control surface with respect to a fixed wing portion;
    providing a second actuator configured to move a second flight control surface with respect to the fixed wing portion, wherein the second flight control surface is disposed adjacent the first flight control surface;
    controlling the first and second actuators to move the first and second flight control surfaces during normal operation; and
    using a third actuator to selectively engage with and move the second flight control surface out of a path of movement of the first flight control surface only in the event of a failure in the second actuator or its control, so as to avoid direct contact between the first and second flight control surfaces.

20. A method according to claim 19, wherein the third actuator is disengaged from the second flight control surface during normal operation.

21. A method according to claim 19, further comprising back-driving the second actuator during movement of the second flight control surface by the third actuator.

22. A method according to claim 19, wherein movement of the third actuator is driven by movement of the first flight control surface.

23. A method according to claim 19, wherein the first flight control surface is a trailing edge flap and the second flight control surface is a spoiler.

* * * * *